C. O. BAUGHMAN.
CUSHION TIRE.
APPLICATION FILED AUG. 10, 1908.
940,919.
Patented Nov. 23, 1909.
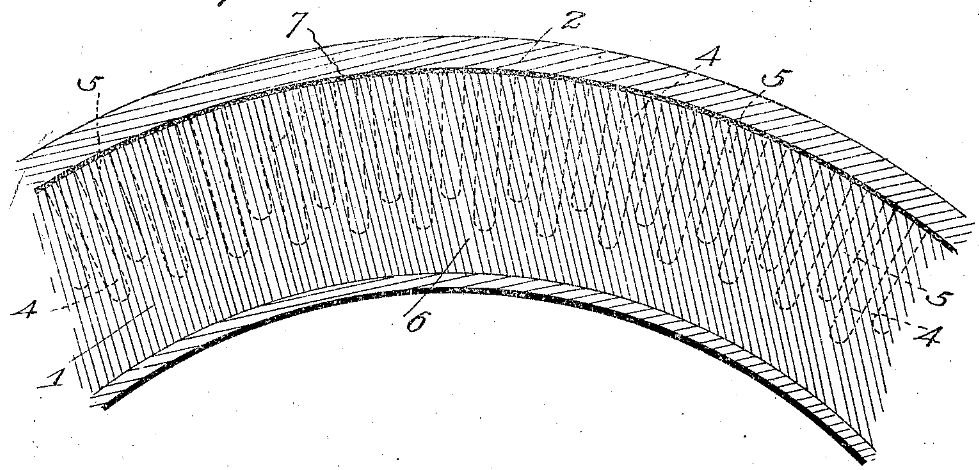
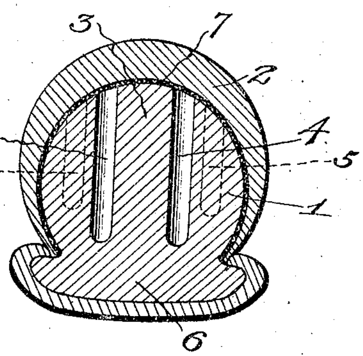
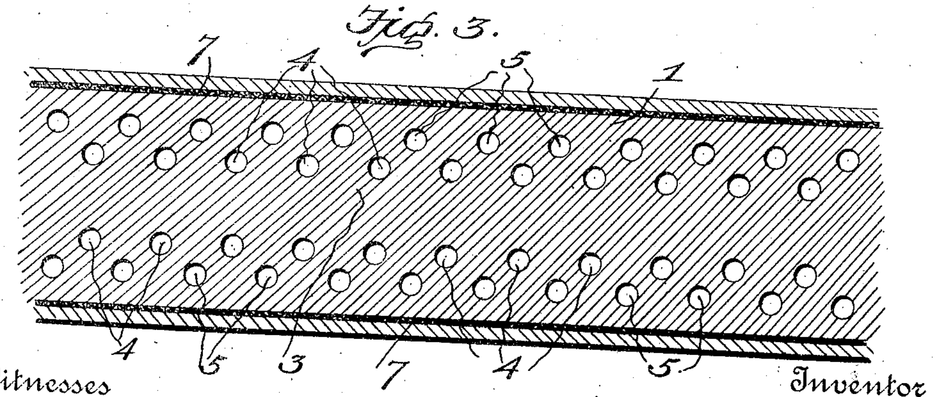
Witnesses
C. E. Hunt.
C. H. Griesbauer
Inventor
C. O. Baughman
by A. B. Willson & Co.
Attorneys

UNITED STATES PATENT OFFICE.

CHARLES ORESTES BAUGHMAN, OF AKRON, OHIO, ASSIGNOR TO W. J. FRANK, OF AKRON, OHIO.

CUSHION-TIRE.

940,919. Specification of Letters Patent. Patented Nov. 23, 1909.

Application filed August 10, 1908. Serial No. 447,800.

*To all whom it may concern:*

Be it known that I, CHARLES O. BAUGHMAN, a citizen of the United States, residing at Akron, in the county of Summit and State of Ohio, have invented certain new and useful Improvements in Cushion-Tires; and I do declare the following to be a full, clear, and exact description of the invention, such as will enable others skilled in the art to which it appertains to make and use the same.

This invention relates to an improved cushion tire for vehicles adapted for use on automobiles.

The object of the invention is to provide a cushion tire of a cellular type constructed to permit the central support of the tire to expand under compression outward or toward the sides thereby rendering the tire very resilient, similar to a pneumatic tire and which will also decrease the amount of material necessary to manufacture the same.

With this and other objects in view, the invention consists of certain novel features of construction, combination and arrangement of parts, as will be more fully described and particularly pointed out in the appended claim.

In the accompanying drawings, Figure 1 represents a longitudinal vertical section of a portion of a tire constructed in accordance with this invention. Fig. 2 represents a transverse vertical section thereof; and Fig. 3 represents a horizontal section.

In the embodiment illustrated, a cellular tire 1 is shown having a tread portion 2 with a solid central support 3 extending around the entire circumference of the tire and with two rows of holes or cells 4 and 5 arranged around the entire circumference of the tire on each side of the central support 3, the cells of one row being arranged in staggered relation, relative to those of the other row. These cells extend from a point near the periphery inwardly toward the base 6 of the tire and the cells of the inner row 4 thereof are made longer and deeper than the cells of the row 5 to prevent weakening of the tire near the portion inclosed by the rim, the row of short cells being the outside row. A strip of fabric 7 is preferably placed over the outer ends of the cells and the tread 2 is built up thereon in any suitable manner.

This type of tire will eliminate punctures, blow-outs and the like which are incident to the pneumatic tires and they will outwear the pneumatic tire and be less expensive while at the same time being very resilient.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described and ascertained the nature of my invention, what I claim as new and desire to secure by Letters-Patent is:

A cushion tire for wheels comprising a circular attaching base, an annular central extension integral with the base, a plurality of rows of radial wells arranged in each side of the central extension, the wells in the inner row being of greater depth than the wells in the outer row and staggered with relation to the wells in the outer row, a fabric arranged over the extension, and an elastic tread strip secured to the fabric and protecting the same at all points.

In testimony whereof I have hereunto set my hand in presence of two subscribing witnesses.

CHARLES ORESTES BAUGHMAN.

Witnesses:
H. A. VALENTINE,
F. A. KITSELMAN.